(12) United States Patent
Dry et al.

(10) Patent No.: US 10,569,669 B2
(45) Date of Patent: Feb. 25, 2020

(54) IN-FLOOR TRACK SYSTEM

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 15/906,037

(22) Filed: Feb. 27, 2018

(65) Prior Publication Data
US 2019/0263295 A1    Aug. 29, 2019

(51) Int. Cl.
*B60N 2/01* (2006.01)
*B60N 2/06* (2006.01)
*B60N 2/07* (2006.01)
*B60N 2/02* (2006.01)
*B60N 2/90* (2018.01)

(52) U.S. Cl.
CPC .............. *B60N 2/0292* (2013.01); *B60N 2/01* (2013.01); *B60N 2/0224* (2013.01); *B60N 2/062* (2013.01); *B60N 2/067* (2013.01); *B60N 2/07* (2013.01); *B60N 2/919* (2018.02); *B60N 2/0712* (2013.01)

(58) Field of Classification Search
CPC ........ B60N 2/0292; B60N 2/01; B60N 2/012; B60N 2/06; B60N 2/062; B60N 2/065; B60N 2/0735; B60N 2/0737; B60N 2/0745; B60R 16/027

USPC .................................................. 296/64, 65.13
See application file for complete search history.

(56) References Cited

U.S. PATENT DOCUMENTS

| 4,341,415 | A | * | 7/1982 | Braun | B60N 2/06 296/64 |
|---|---|---|---|---|---|
| 6,145,911 | A | * | 11/2000 | Sturt | B60N 2/071 296/65.01 |
| 6,264,261 | B1 | * | 7/2001 | Krafcik | B60N 2/2839 296/37.8 |
| 6,457,765 | B1 | * | 10/2002 | Bergquist | B60N 2/01 296/64 |
| 7,252,319 | B2 | * | 8/2007 | Toyota | B60N 2/062 296/65.09 |
| 7,341,302 | B2 | | 3/2008 | Slade | |
| 7,380,859 | B2 | | 6/2008 | Gardiner | |
| 7,441,822 | B1 | * | 10/2008 | Day | B60N 2/01541 296/65.01 |
| 7,677,629 | B2 | * | 3/2010 | Akiya | B60N 2/01 296/64 |
| 7,677,656 | B2 | | 3/2010 | Saberan et al. | |
| 7,712,829 | B2 | * | 5/2010 | Park | B60N 2/01 296/65.13 |
| 7,748,766 | B2 | * | 7/2010 | Villeminey | B60N 2/065 296/64 |
| 9,248,759 | B2 | * | 2/2016 | Brand | B60N 2/14 |
| 2002/0021016 | A1 | * | 2/2002 | Bergquist | B60N 2/01 296/65.09 |

(Continued)

Primary Examiner — Gregory A Blankenship
(74) Attorney, Agent, or Firm — Vichit Chea; Price Heneveld LLP

(57) ABSTRACT

A vehicle includes first and second rows of seats and a rail system. The rail system includes lateral and longitudinal tracks. First, second, and third seating assemblies are each coupled to the rail system. The first and third seating assemblies are actuatable along the rail system to be positioned between a pair of rearward wheel wells.

20 Claims, 12 Drawing Sheets

(56) References Cited

U.S. PATENT DOCUMENTS

| | | |
|---|---|---|
| 2003/0234550 A1 | 12/2003 | Brooks et al. |
| 2009/0195037 A1 | 8/2009 | Plavetich et al. |
| 2017/0028876 A1* | 2/2017 | Yamada ................. B60N 2/012 |
| 2017/0225593 A1* | 8/2017 | De Saulles .............. B60N 2/06 |
| 2017/0267124 A1* | 9/2017 | Numazawa .............. B60N 2/01 |
| 2017/0368964 A1* | 12/2017 | Kim ..................... B60N 2/0232 |
| 2019/0126780 A1* | 5/2019 | Dry ........................ B60N 2/005 |
| 2019/0126786 A1* | 5/2019 | Dry ........................ B60N 2/005 |

* cited by examiner

IN-FLOOR TRACK SYSTEM

FIELD OF THE DISCLOSURE

The present disclosure generally relates to vehicles. More specifically, the present disclosure relates to seating assemblies for vehicles.

BACKGROUND OF THE INVENTION

Vehicles are often provided with seating assemblies that can be adjusted for occupant comfort. Some seating assemblies in vehicles are capable of translation in fore-aft or side-to-side directions. However, there is a need for reconfigurable seating assemblies in vehicles that are capable of translation to various locations within a cabin of the vehicle.

SUMMARY OF THE INVENTION

According to a first aspect of the present disclosure, a vehicle includes first and second rows of seats, and a rail system with lateral and longitudinal tracks and first, second, and third seating assemblies, each coupled to the rail system. The first and third seating assemblies are actuatable along the rail system to be positioned between a pair of rearward wheel wells.

Embodiments of the first aspect of the present disclosure can include any one or a combination of the following features:
- the first and third seating assemblies are positioned to be entirely between the pair of rearward wheel wells;
- the actuation of the first and the third seating assemblies results in a translation of the first and the third seating assemblies in a rearward direction of at least about 25 cm;
- the rail system is positioned in a floor pan of the vehicle;
- actuation of the first and the third seating assemblies to between the pair of rearward wheel wells maintains functionality of the second seating assembly;
- the second seating assembly is actuated toward the first row of seats, wherein the second seating assembly is utilized as a center console for the first row of seats;
- the second seating assembly is utilized as a seating position by an occupant;
- the second seating assembly is utilized by occupants of the first and the third seating assemblies as at least one of an ottoman, a work surface, an entertainment interface, and a storage area;
- the first, second, and third seating assemblies are each coupled to the rail system by one or more anchors;
- the one or more anchors each include a post that is surrounded by a main body, wherein the post extends above and below the main body and terminates in an upper head and a lower head; and
- the one or more anchors each further include a locking pin that is surrounded by the post, wherein the locking pin can be vertically actuated with in the post.

According to a second aspect of the present disclosure, a vehicle includes first and second rows of seats and a rail system with lateral and longitudinal tracks and first, second, and third seating assemblies each coupled to the rail system by one or more anchors. The first and third seating assemblies are actuatable along the rail system to be positioned between a pair of rearward wheel wells.

Embodiments of the second aspect of the present disclosure can include any one or a combination of the following features:
- the first and third seating assemblies are positioned to be entirely between the pair of rearward wheel wells;
- the one or more anchors each include a post that is surrounded by a main body, wherein the post extends above and below the main body and terminates in an upper head and a lower head;
- the one or more anchors each further include a locking pin that is surrounded by the post, wherein the locking pin can be vertically actuated within the post; and
- actuation of the first and the third seating assemblies to between the pair of rearward wheel wells maintains functionality of the second seating assembly.

According to a third aspect of the present disclosure, a vehicle including first and second rows of seats. A rail system with lateral and longitudinal tracks and a first, second, and third seating assemblies each coupled to the rail system by one or more anchors. The first and third seating assemblies are actuatable along the rail system to be positioned between a pair of rearward wheel wells while maintaining functionality of the second seating assembly.

Embodiments of the third aspect of the present disclosure can include any one or a combination of the following features:
- the second seating assembly is utilized as at least one of an ottoman, a work surface, an entertainment interface, a center console, and a storage area;
- the one or more anchors each include a post that is surrounded by a main body, wherein the post extends above and below the main body and terminates in an upper head and a lower head; and
- the one or more anchors each further include a locking pin that is surrounded by the post, wherein the locking pin can be vertically actuated within the post.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
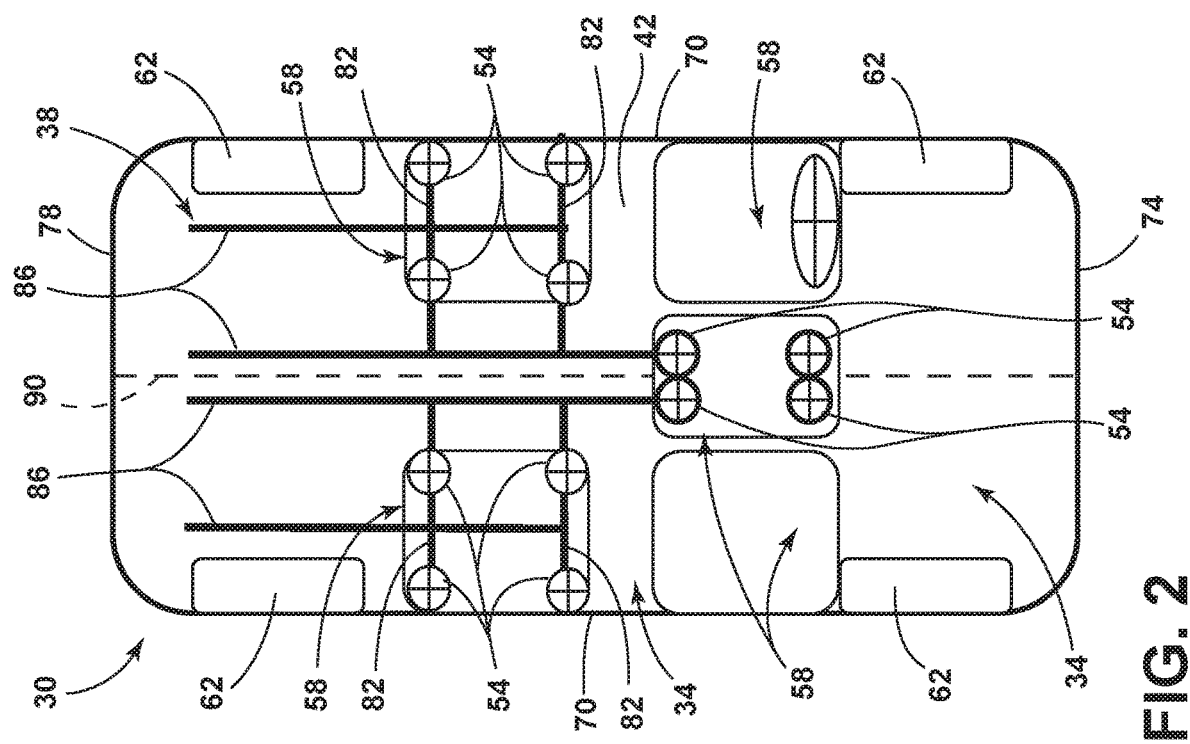
FIG. 1 is a top plan view of a cabin of a vehicle, illustrating first and second rows of seats.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-14, reference numeral 30 generally designates a vehicle. The vehicle 30 is equipped with a cabin 34. The cabin 34 is equipped with a rail system 38 that operably couples to a floor pan 42 of the vehicle 30. The cabin 34 is provided with a floor covering 46 that may provide a generally flat and continuous surface. The rail system 38 and the floor pan 42 may be positioned below the floor covering 46. A bridge 50 may be provided in the floor covering 46 that is actuatable by an anchor 54 of a seating assembly 58 that is coupled to the rail system 38. Accordingly, the anchor 54 may initiate a lifting of the bridge 50 as the seating assembly 58 traverses the rail system 38. Regions of the rail system 38 that do not currently have one of the anchors 54 present may be covered by the bridge 50 when the bridge 50 is in a lowered position such that unwanted items (e.g., shoes, luggage, personal items, etc.) and debris are excluded from accessing or becoming lodged in the rail system 38.

Figure 2:
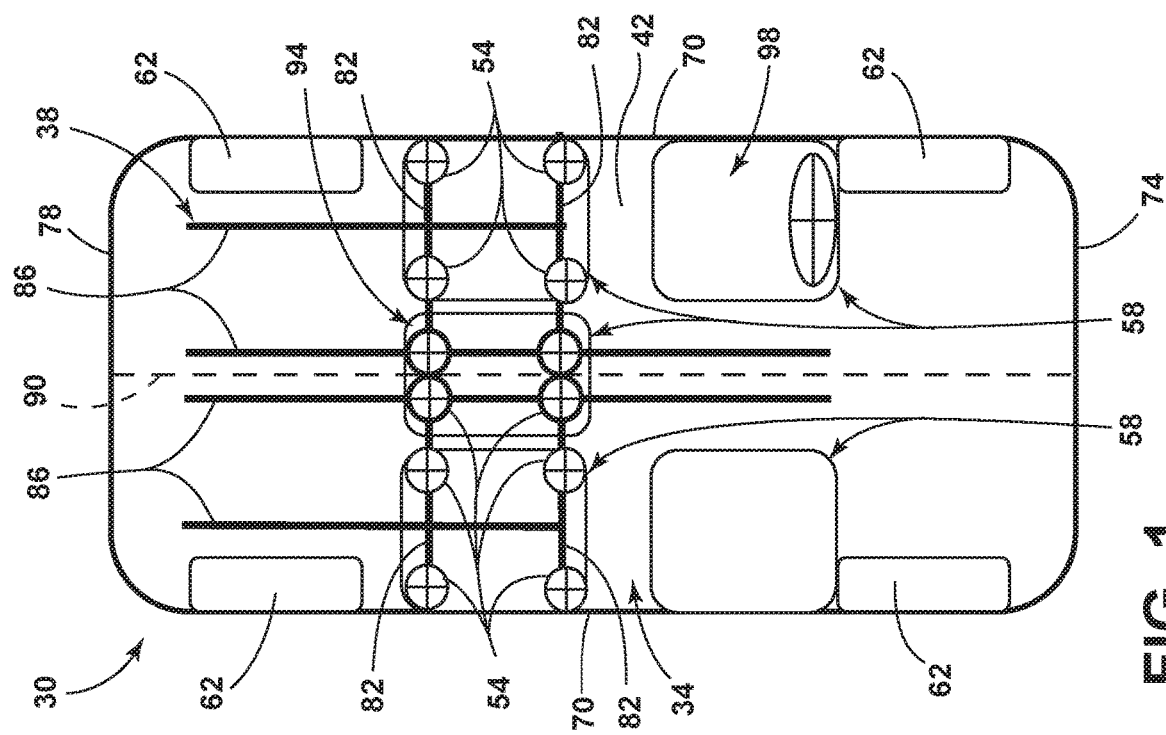
FIG. 2 is a top plan view of the cabin of the vehicle, illustrating a center seating assembly actuated from the second row of seats to the first row of seats.
Figure 3:
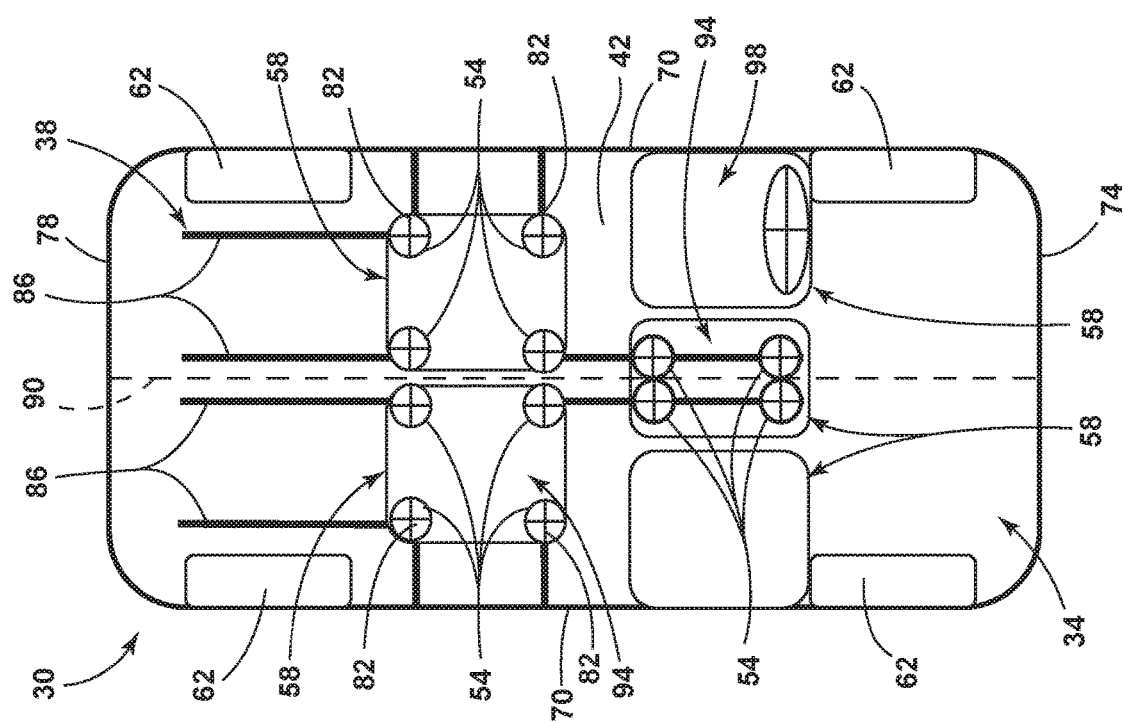
FIG. 3 is a top plan view of the cabin of the vehicle, illustrating outboard seating assemblies actuated toward one another.

Referring again to FIGS. 1-4, the vehicle 30 is equipped with a plurality of wheel assemblies 62 and access doors. The seating assemblies 58 may traverse the cabin 34 of the vehicle 30 along the rail system 38 laterally between sides 70 of the vehicle 30 and/or longitudinally from a front 74 to a back 78 of the vehicle 30. The rail system 38 includes one or more lateral tracks 82 and one or more longitudinal tracks 86 to facilitate the lateral and longitudinal movements of the seating assemblies 58, respectively. The longitudinal tracks 86 may be symmetrically disposed about a longitudinal axis 90 of the vehicle 30. The seating assemblies 58 may be actuated along the rail system 38 to assume a variety of configurations. For example, the seating assemblies 58 may be arranged as a second row of seats 94. The second row of seats 94 may include a center seating assembly that is flanked on either side by outboard seating assemblies (FIG. 1). The outboard seating assemblies may alternatively be referred to as first and third seating assemblies while the center seating assembly may alternatively be referred to as a second seating assembly. In some examples, the center seating assembly may be actuated in a direction toward the front 74 of the vehicle 30 to be used as a center console or additional seating in a first row of seats 98 (FIG. 2). The center seating assembly may be a fold-flat seating assembly and/or may include a work surface. The work surface may be a fold out tabletop or desk that has a surface area at least equal to a surface area of the seatback of the center seating assembly. With the center seating assembly positioned in the first row of seats 98, the outboard seating assemblies in the second row of seats 94 may be actuated toward one another along the lateral tracks 82 such that the outboard seating assemblies are adjacent or in close proximity to one another (FIG. 3). In some examples, the center seating assembly may be removed from the vehicle 30 to permit actuation of the outboard seating assemblies toward one another rather than actuating the center seating assembly toward the first row of seats 98. For example, the center seating assembly, or any other seating assembly 58 in the vehicle 30, may be actuated along the longitudinal tracks 86 toward the back 78 of the vehicle 30 and removed from an access door located there, such as a liftgate. Alternatively, the seating assemblies 58 may be removed by actuation along the lateral tracks 82 from an access door on one of the sides 70 of the vehicle 30, such as a side-door.

Figure 4:
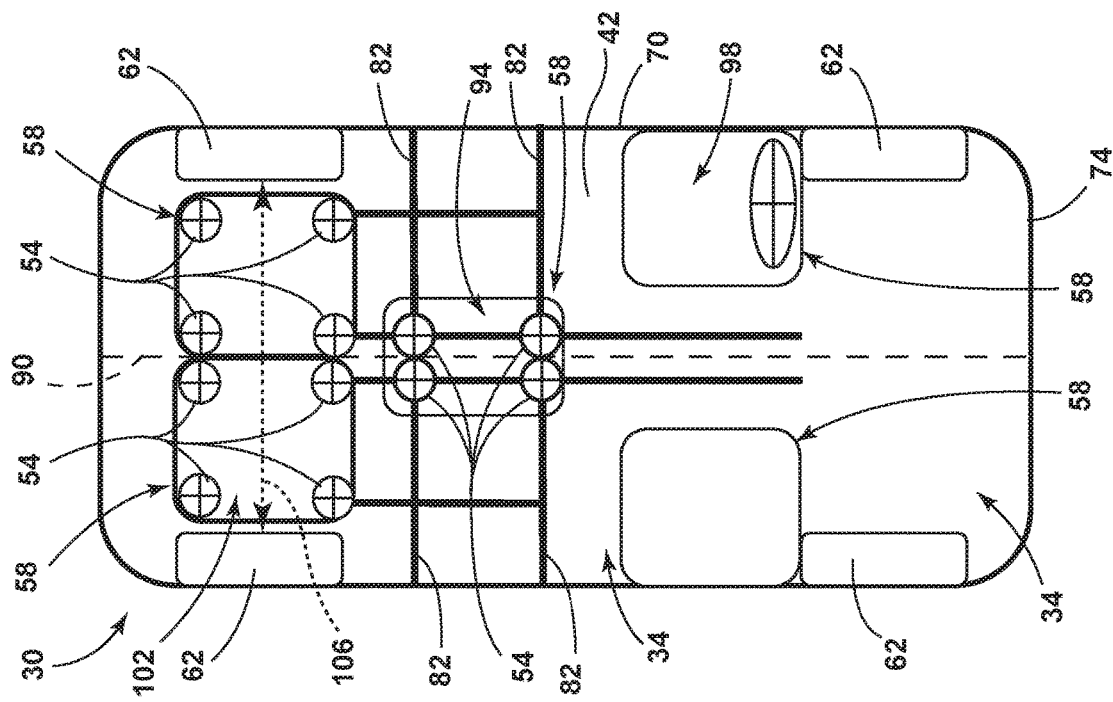
FIG. 4 is a top plan view of the cabin of the vehicle, illustrating the outboard seating assemblies actuated to a third row of seats.

Referring further to FIGS. 1-4, once the outboard seating assemblies have been actuated toward one another such that the outboard seating assemblies are adjacent to one another (FIG. 3), then the outboard seating assemblies may be actuated rearward toward the back 78 of the vehicle 30 along the longitudinal tracks 86. Accordingly, the outboard seating assemblies may be transitioned from the second row of seats 94 to a third row of seats 102 (FIG. 4). The outboard seating assemblies are configured to fit entirely within a distance 106 between a pair of rearward wheel wells of the vehicle 30 as the third row of seats 102. For example, the outboard seating assemblies may fit entirely within the distance 106 between the pair of rearward wheel wells and be generally aligned with a rear axle that couples the wheel assemblies 62 toward the back 78 of the vehicle 30. Additionally, the longitudinal tracks 86 of the rail system 38 are configured to allow actuation of the outboard seating assemblies to be positioned entirely between the rearward wheel wells of the vehicle 30 and entirely rearward of their former positions in the second row of seats 94. When the outboard seating assemblies are actuated from the second row of seats 94 to the third row of seats 102, the outboard seating assemblies may be translated in a rearward direction along the longitudinal tracks 86 at least about 10 cm, at least about 15 cm, at least about 20 cm, at least about 25 cm, at least about 30 cm, at least about 35 cm, at least about 40 cm, at least about 45 cm, at least about 50 cm, and/or combinations or ranges thereof. Accordingly, the center seating assembly may be actuated from the first row of seats 98 rearward to the original position of the center seating assembly in the second row of seats 94 while the outboard seating assemblies remain in the third row of seats 102 (FIG. 4). As positioned in FIG. 4, the center seating assembly may be utilized for a variety of functionalities that include, but are not limited to, a seating position, an ottoman, a work surface, an entertainment interface, a center console, and/or a storage area. The occupants of the outboard seating assemblies may utilize the center seating assembly as positioned in FIG. 4 as the ottoman, the work surface, the entertainment interface, and/or the storage area; however, the present disclosure is not so limited. The center seating assembly may be actuated along the later tracks 82 to any location the occupants of the third row of seats 102 desire. In some examples, the center seating assembly may be actuated to the third row of seats 102 to increase space in the second row of seats 94 for the outboard seating assemblies.

Figure 5:
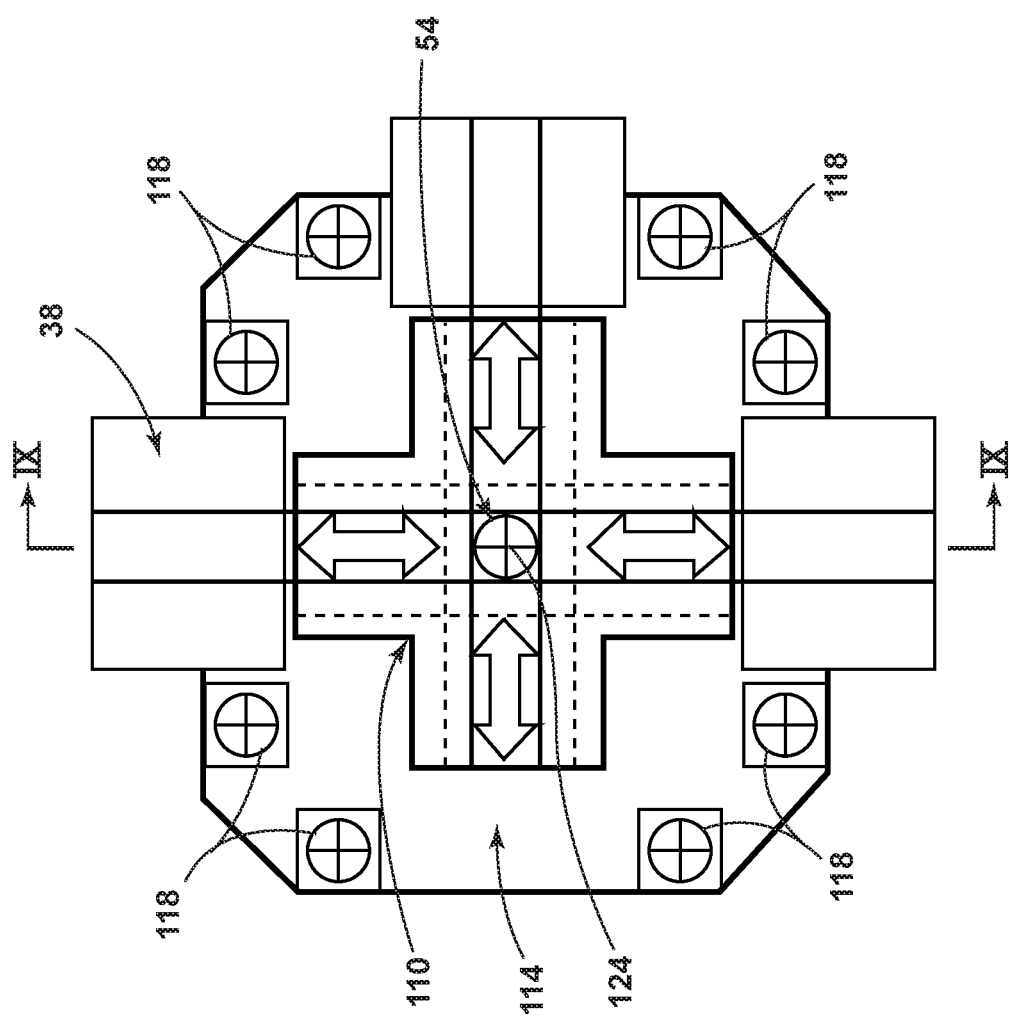
FIG. 5 is a top view of a corner of a rail system, according to one embodiment.
Figure 6:
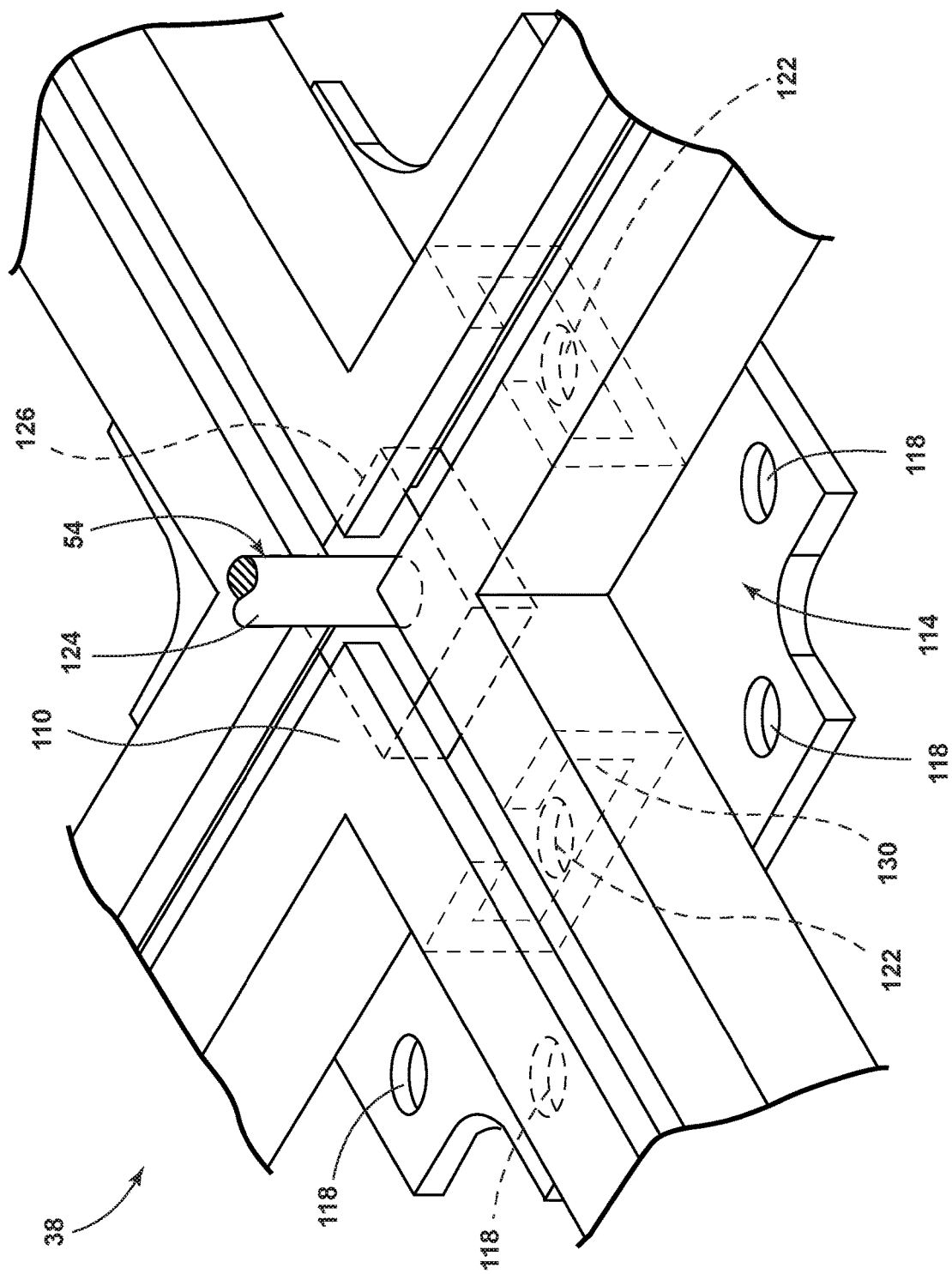
FIG. 6 is a top perspective view of the corner of the rail system having an anchor coupled thereto, according to one embodiment.

Referring now to FIGS. 5 and 6, a junction of the rail system 38, such as a corner 110, is shown with the anchor 54 operably coupled with the rail system 38. The corner 110 may be a two-way, three-way, or four-way junction. Said another way, the corner 110 may apply to various transitions between tracks (e.g., the lateral tracks 82 and the longitudinal tracks 86) of the rail system 38 to allow the anchors 54 of the seating assemblies 58 to change directions and/or generally transition between tracks. A junction plate 114 may be positioned below the rail system 38. The junction plate 114 may define floor-coupling apertures 118 that are utilized to couple the junction plate 114 to the floor pan 42 (FIG. 8) or another support structure. The junction plate 114 may be operably coupled to the rail system 38 or may be integrally formed with the rail system 38. In some examples, the rail system 38 may be integrally formed with the floor pan 42. The rail system 38 is equipped with a plurality of locking pin apertures 122 that are configured to receive a locking pin 124 of the anchor 54. The locking pin 124 may pass through a foot 126 of the anchor 54 to engage with the locking pin apertures 122. The rail system 38 may define a channel 130. The channel 130 may be configured to resemble an inverted T. The foot 126 of the anchor 54 may generally correspond or be associated with a cross member of the inverted T channel 130 and the locking pin 124 may generally correspond with a vertical leg of the inverted T channel 130.

Figure 7:
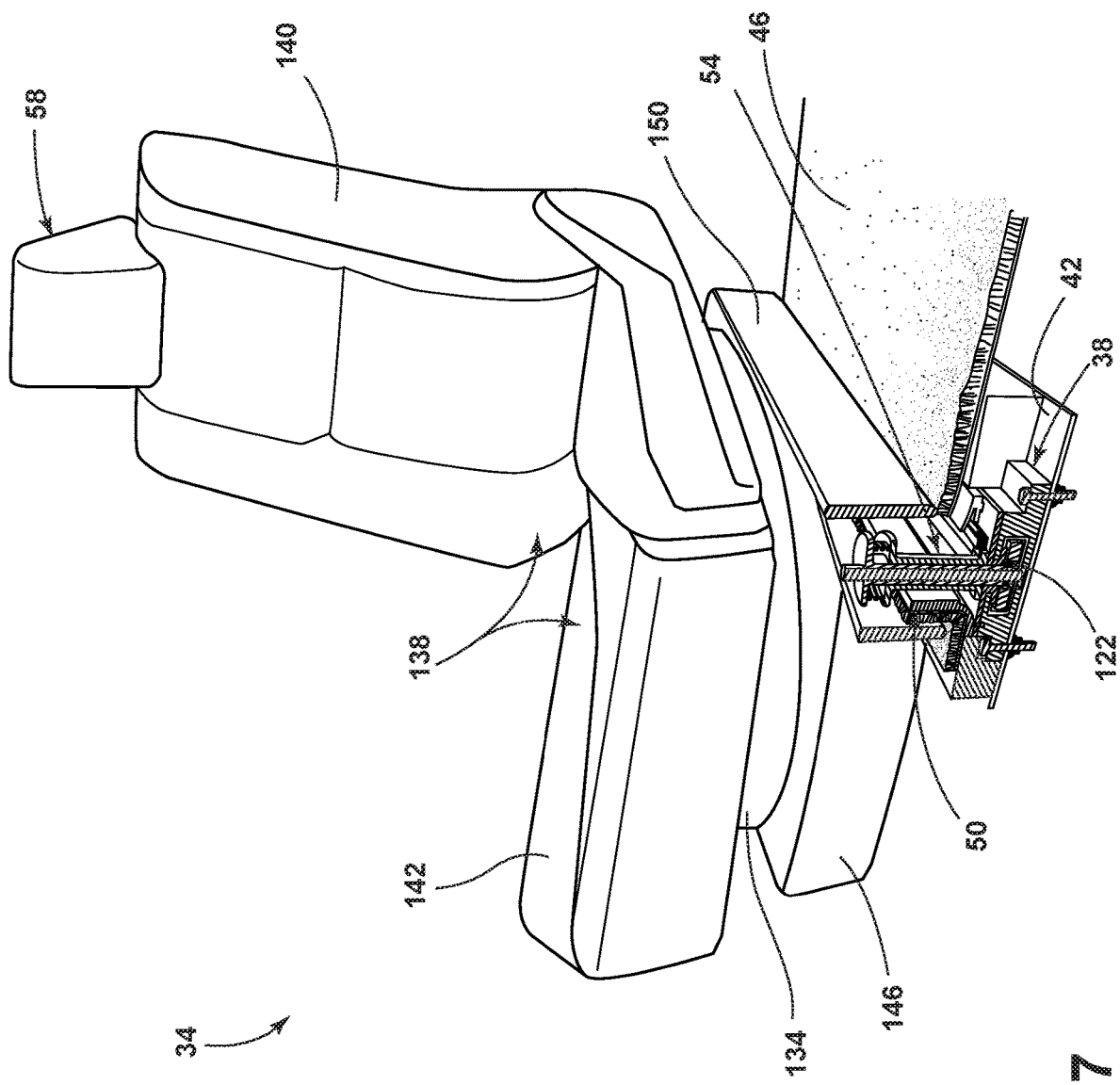
FIG. 7 is a side perspective view of the seating assembly with a partial cross-sectional view of the anchor, according to one embodiment.
Figure 8:
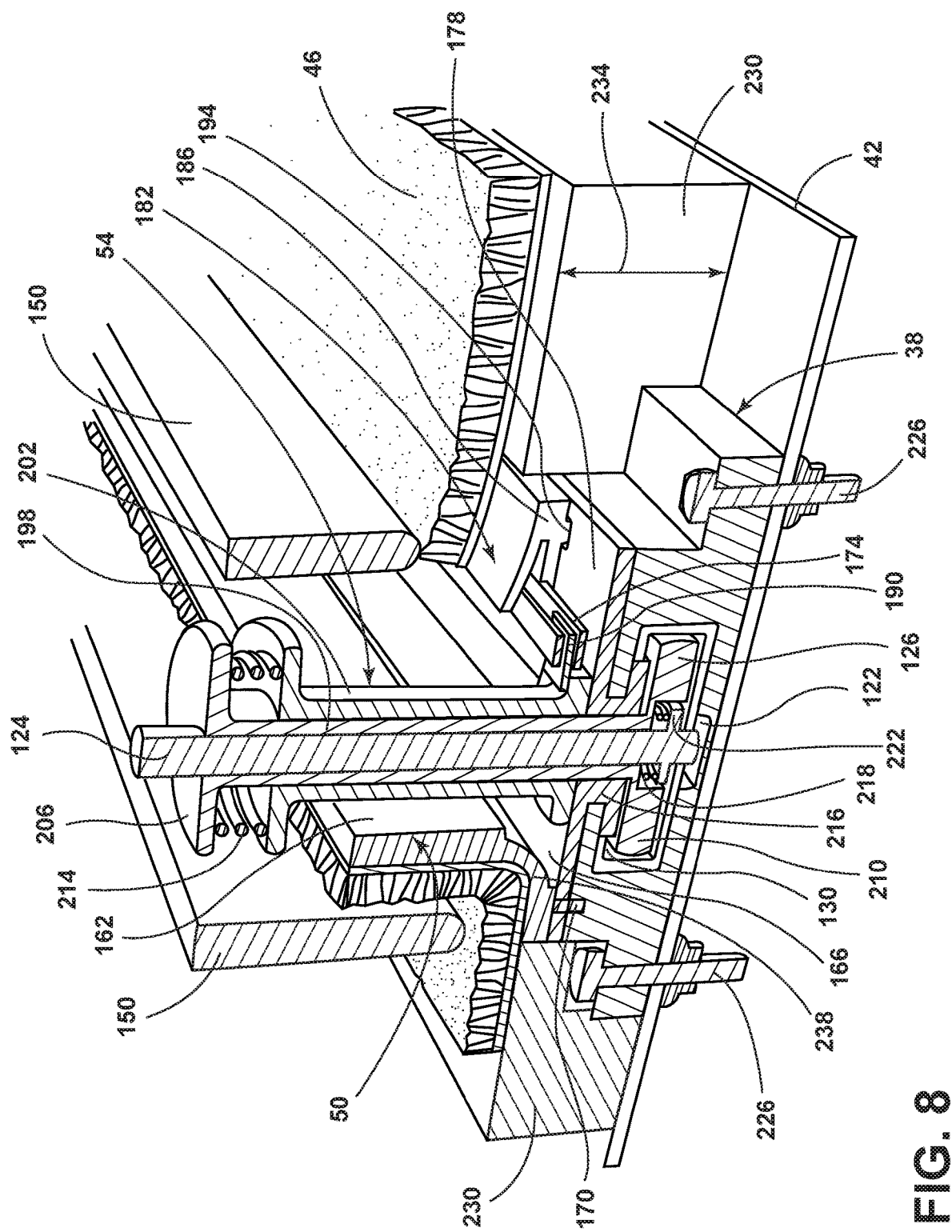
FIG. 8 is an enlarged view of the anchor depicted in FIG. 7.
Figure 11:
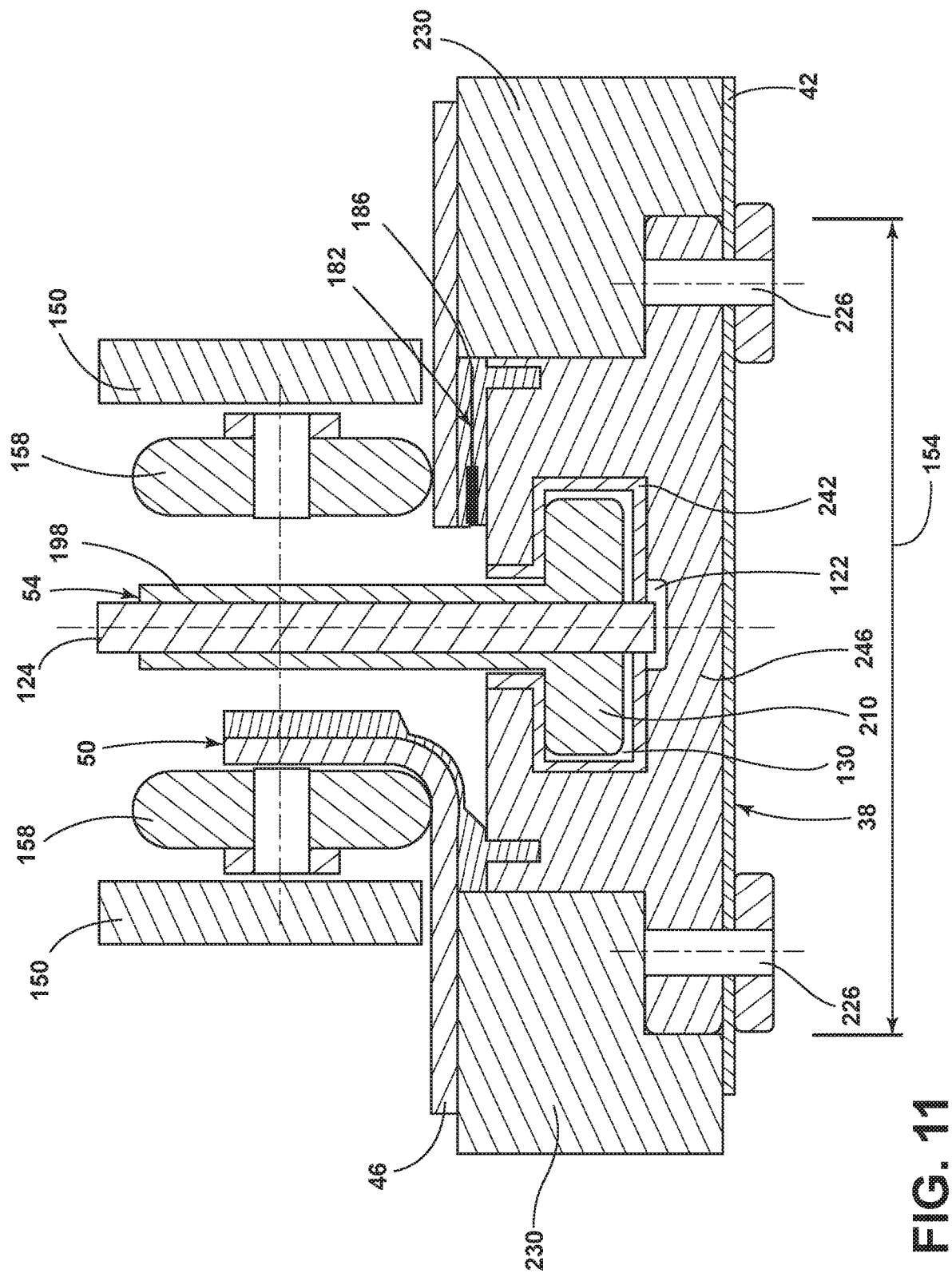
FIG. 11 is a cross-sectional view of the rail system and the anchor, taken along line IX-IX of FIG. 5, according to a further embodiment.
Figure 14:
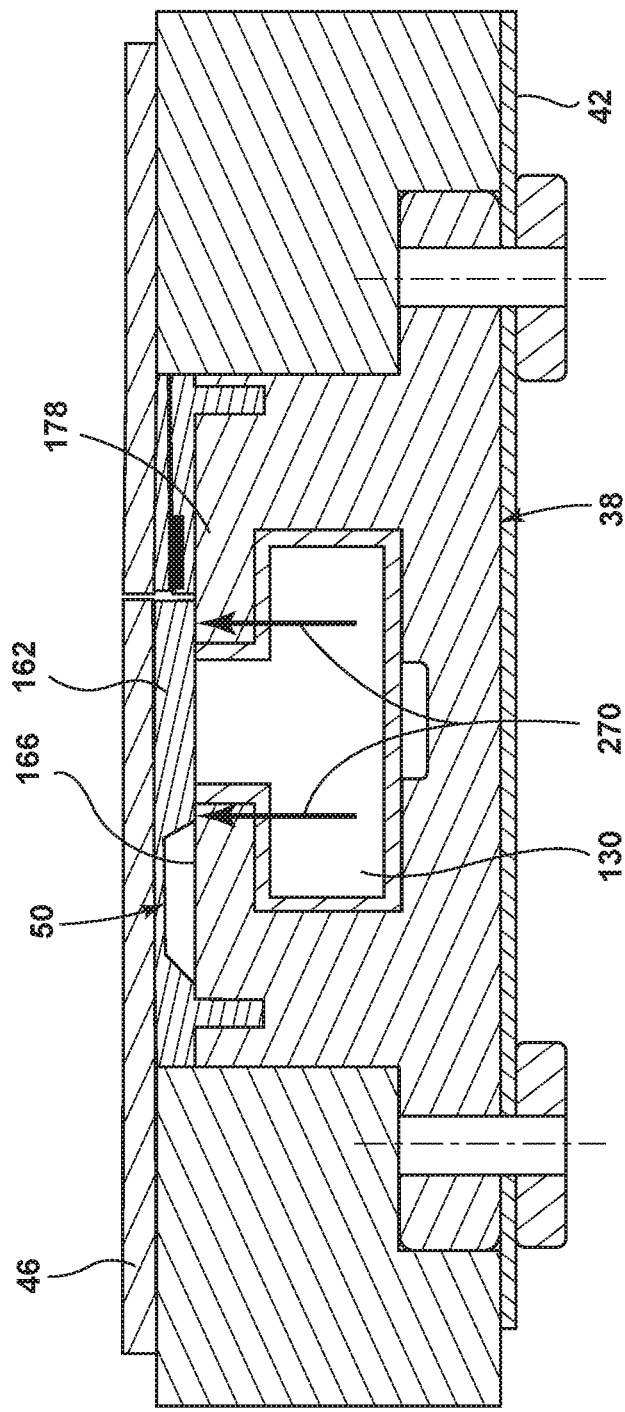
FIG. 14 is a cross-sectional view of the rail system, taken along line IX-IX of FIG. 5, illustrating a bridge of a floor covering in a lowered position.

Referring now to FIGS. 7 and 8, the seating assembly 58 may rotate about a vertical axis as a result of the coupling of a pivot mechanism 134 to a comfort structure 138 of the seating assembly 58. Accordingly, the outboard seating assemblies and the center seating assembly may be pivoted about a vertical axis defined by the pivot mechanism that allows the seating assemblies 58 to be rotated or pivoted to assume a variety of rotational positions within the vehicle 30. For example, the outboard seating assemblies may be actuated to the third row of seats 102 and the center seating assembly may be rotated to face vehicle-rearward to enable a conversational arrangement of the cabin 34 (FIG. 1). Similarly, once the center seating assembly has been actuated out of the second row of seats 94, then the outboard seating assemblies may be rotated to face one another to assume an alternative conversational arrangement. It is also contemplated that the center seating assembly may be actuated to the first row of seats 98 or a position that is intermediately between the first and second rows of seats 98, 94 and rotated vehicle rearward while the outboard seating assemblies are rotated to generally face diagonally within the cabin 34 toward the center seating assembly to assume another alternative conversational arrangement. The comfort structure 138 may include a seatback 140 pivotably coupled to a seat 142. The pivot mechanism 134 may be positioned between the seat 142 and a seat base 146. The seat base 146 of the seating assembly 58 may include a trim portion 150 that is positioned to generally correspond with a width 154 of the rail system 38, as best seen in FIG. 11. The trim portion 150 preferably encloses the anchor 54 such that a user is presented with a smooth and aesthetically pleasing seating assembly 58. Additionally, by enclosing the anchors 54 with the trim portion 150, the anchors 54 and rail system 38 may be protected from debris. In embodiments that utilize a wheel 158, such as those shown in FIGS. 11 and 12, the trim portion 150 may additionally enclose the wheel 158 of the anchor 54. The wheel 158 is configured to interact with the floor covering 46 and aid in smooth movement of the seating assembly 58 as the seating assembly 58 traverses various positions along the rail system 38. In the depicted embodiment, the wheel 158 is not utilized. A plow may be positioned below the floor covering 46 and above the rail system 38 that is operably coupled to an advancing edge of the anchor 54 such that the floor covering 46 and/or the bridge 50 is raised. The trim portion 150 may extend about a circumference of the seat base 146 and ensure that the floor covering 46 and/or the bridge 50 are not raised prematurely while also ensuring the closure of the floor covering 46 and/or bridge 50 once the anchors 54 have passed. Additionally or alternatively, the bridge 50 may be made of a material that is hard and resilient such that once the anchors 54 pass, the restorative force stored in the structure of the bridge 50 forces the bridge 50 to lower over the rail system 38. The bridge 50 is shown in a raised position. The bridge 50 of the floor covering 46 may be operably coupled to the rail system 38. The bridge 50 generally corresponds with the channel 130 that is defined by the vertical leg of the inverted T channel 130 in the rail system 38. The bridge 50 includes a rigid arm 162 that extends over the channel 130 in the rail system 38 such that the floor covering 46 is prevented from entering the channel 130 when the bridge 50 is in a lowered position (FIG. 14). The bridge 50 may be operably coupled to a first side 166 of the rail system 38 by a bridge coupling protrusion 170. A conductor 174 may be positioned between the rail system 38 and the floor covering 46 on a second side 178 of the rail system 38. The first and second sides 166, 178 of the rail system 38 may be separated by the channel 130 such that the bridge 50 and the conductor 174 are positioned on either side of the channel 130.

Referring again to FIGS. 7 and 8, the conductor 174 may further include a housing 182 that is equipped with a living hinge 186. An electrical conductor 190 may separate the housing 182 such that the housing 182 opens about the living hinge 186 to allow an electrical connection between the conductor 174 and the electrical conductor 190, thereby providing the seating assembly 58 with electrical power. The housing 182 may be an elastomeric extrusion that is dirt resistant and includes a rail coupling tab 194 that engages with the rail system 38. The anchor 54 may include a post 198 that is surrounded by a main body 202. The main body 202 may have a diameter that is at least about 10 mm, at least about 15 mm, at least about 20 mm, at least about 25 mm, at least about 30 mm, and/or combinations or ranges thereof. In some embodiments, the post 198 extends above and below the main body 202 and terminates in an upper head 206 and a lower head 210. The lower head 210 may alternatively be referred to as the foot 126 of the anchor 54. The post 198 surrounds the locking pin 124. The locking pin 124 can be actuated within the post 198 such that the locking pin 124 may be selectively engaged and disengaged with the locking pin apertures 122 of the rail system 38. The locking pin apertures 122 may alternatively be referred to as positioning apertures. The anchor 54 may be equipped with a first spring 214 that is positioned between the upper head 206 and the main body 202. In some embodiments, the weight of the seating assembly 58 is transferred to the post 198 and/or cushioned by the interaction of the first spring 214 and the upper head 206. Accordingly, the weight of the seating assembly 58 may be substantially supported by the post 198, which interacts with a low friction portion 216. Additionally, the first spring 214 may act in an upward direction on an underside of the upper head 206 such that the main body 202 of the anchor 54 is lifted to suspend the lower head 210 within the rail system 38. A benefit of the depicted embodiment over embodiments that utilize the wheel 158 (e.g., FIG. 11) may be that the main body 202 is capable of immediately transitioning to traveling in a different direction at an intersection of the rail system 38, whereas the wheel 158 may have to caster to a different orientation prior to changing directions. A second spring 218 may be positioned at a lower region of the locking pin 124. The second spring 218 may be configured to bias the locking pin 124 in a downward direction, for example, to engage with one of the locking pin apertures 122. The second spring 218 may be positioned within the lower head 210 of the post 198. The locking pin 124 may further include a shoulder 222 that engages with an underside of the second spring 218. An upper side of the second spring 218 may engage with the lower head 210 of the post 198. The lower head 210 may define a recessed area in an underside thereof that is configured to receive the second spring 218 and the shoulder 222. At least a portion of the locking pin 124 extends below the lower head 210 such that the locking pin 124 engages with the locking pin apertures 122. The first spring 214 and the second spring 218 may act in opposing directions relative to one another. Said another way, the restorative force of the first spring 214 may oppose the restorative force of the second spring 218.

Referring further to FIGS. 7 and 8, in some embodiments, the first spring 214 provides a cushioning or dampening of sudden movements that may be caused by obstructions in a road the vehicle is traveling on. For example, the upper head 206 of the post 198 may be operably coupled to, or integrally formed with, the seat base 146 such that additional cushioning is provided to the seating assembly 58. In such an embodiment, the locking pin 124 may be actuated by a manual lever or by a powered mechanism that is operably coupled to the locking pin 124. The anchor 54 may be configured in a generally cylindrical fashion such that the anchor 54 may be rotated within the rail system 38. In some embodiments, the electrical conductor 190 that is operably coupled to the anchor 54 is generally disc shaped and extends in a continuous fashion radially outward from a circumference of the anchor 54 such that the electrical conductor 190 may engage with the conductor 174 regardless of a rotational position of the anchor 54. The rail system 38 may be operably coupled to the floor pan 42 by one or more fasteners 226. The rail system 38 may include the low friction portion 216 that extends from a top surface of the rail system 38 into the inverted T channel 130 such that an upper surface of the lower head 210, an exterior surface of the post 198, and an underside of the main body 202 may contact the low friction portion 216 thereby reducing the work or effort necessary to move the seating assembly 58 along the rail system 38. The floor pan 42 and the floor covering 46 may be separated by a fill layer 230. A thickness 234 of the fill layer 230 may generally correspond to a height of the rail system 38. The height of the rail system 38 may be inclusive of the bridge 50 and the housing 182 of the conductor 174. The bridge 50 and the housing 182 of the conductor 174 may have similar or equal thicknesses.

Figure 9:
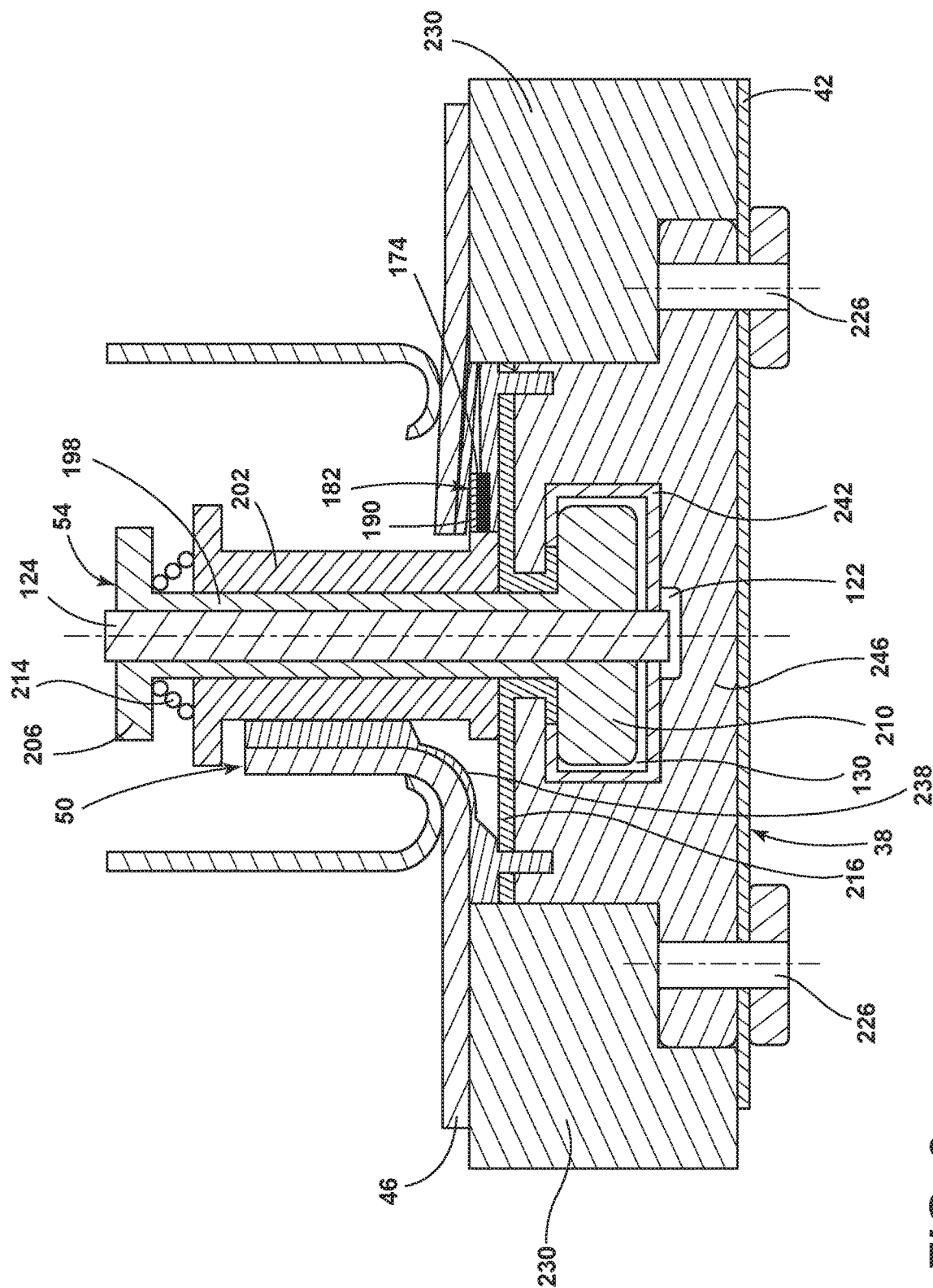
FIG. 9 is a cross-sectional view, taken along line IX-IX of FIG. 5, of the anchor engaged with the rail system, according to one embodiment.
Figure 10:
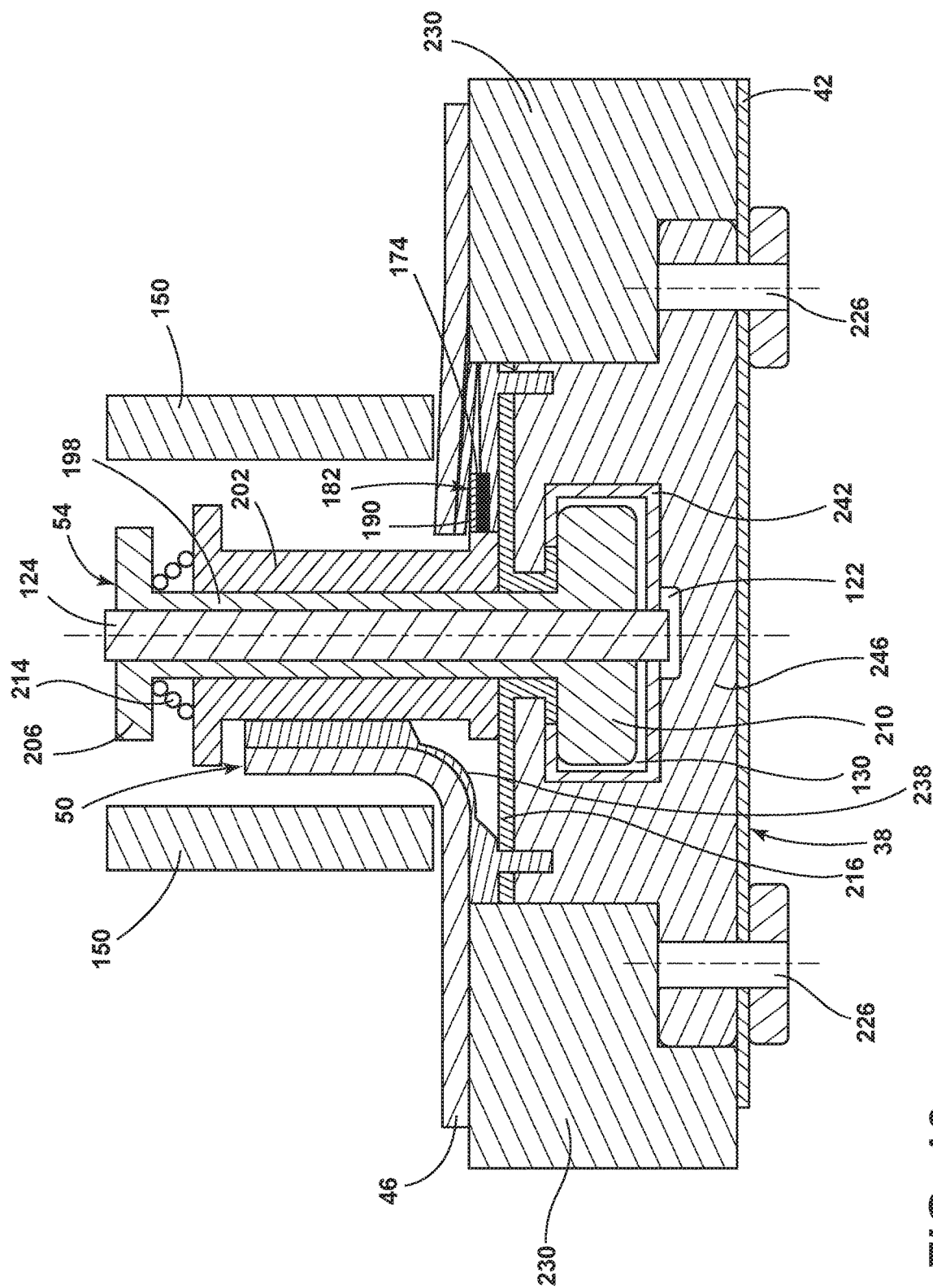
FIG. 10 is a cross-sectional view, taken along line IX-IX of FIG. 5, of the anchor engaged with the rail system, according to another embodiment.

Referring to FIGS. 9 and 10, the anchor 54 may utilize the first spring 214 while omitting the second spring 218 (FIG. 8). Similar to the previous embodiment in FIG. 8, the first spring 214 may aid in actuation of the locking pin 124 or may provide additional cushioning to the seating assembly 58. The anchor 54 is configured to displace the bridge 50 as the anchors 54 traverse the rail system 38. The bridge 50 may be displaced by the anchor 54 such that the bridge 50 pivots in an upward direction about a flexible section 238 to the raised position. While pivoted in the upward direction the bridge 50 may contact an interior surface of the trim portion 150 and/or an external surface of the main body 202 of the anchor 54. The first spring 214 may be positioned between the upper head 206 of the post 198 and an upper surface of the main body 202. The main body 202 of the anchor 54 may rest upon the low friction portion 216 of the rail system 38. Additionally, the construction of the anchor 54 may be such that the lower head 210 of the post 198 is vertically offset from a lower surface of the channel 130. Accordingly, a majority of the weight of the seating assembly 58 may be supported by the main body 202 such that movement of the seating assembly 58 along the rail system 38 is possible with substantially less effort than would be required if the lower head 210 supported the majority of the weight of the seating assembly 58 and the lower head 210 contacted a bottom surface of the channel 130. Said another way, the majority of the weight of the seating assembly 58 is supported by components that experience relatively low friction or resistance to motion (e.g., rolling friction versus sliding friction, low friction material interactions, etc.).

Referring again to FIGS. 9 and 10, the locking pin 124 may be actuated within the post 198 and/or the lower head 210 manually or by utilizing a powered mechanism such that the locking pin 124 selectively engages with the locking pin apertures 122 as the seating assembly 58 traverses the various positions along the rail system 38. In the depicted embodiment, the conductor 174 is positioned on the rail system 38 to be radially inward of the trim portion 150. The trim portion 150 may be positioned above the housing 182 of the conductor 174 such that increased positive contact is maintained between the conductor 174 and the electrical conductor 190 as the seating assembly 58 traverses the rail system 38. The fill layer 230 is positioned between the floor covering 46 and the floor pan 42. The floor pan 42 may be constructed of a hard and rigid material, such as steel. The rail system 38 may be operably coupled to the floor pan 42 by the fasteners 226. The fasteners 226 may be, but are not limited to, weld nuts, bolts, rivets, or the rail system 38 may be integrally formed with the floor pan 42. The rail system 38 may be constructed from various materials. For example, in one embodiment the rail system 38 may be constructed of a steel rail 242 that defines at least a portion of the channel 130 and the steel rail 242 may be positioned within an aluminum rail 246 that makes up a majority of the remainder of the rail system 38.

Figure 12:
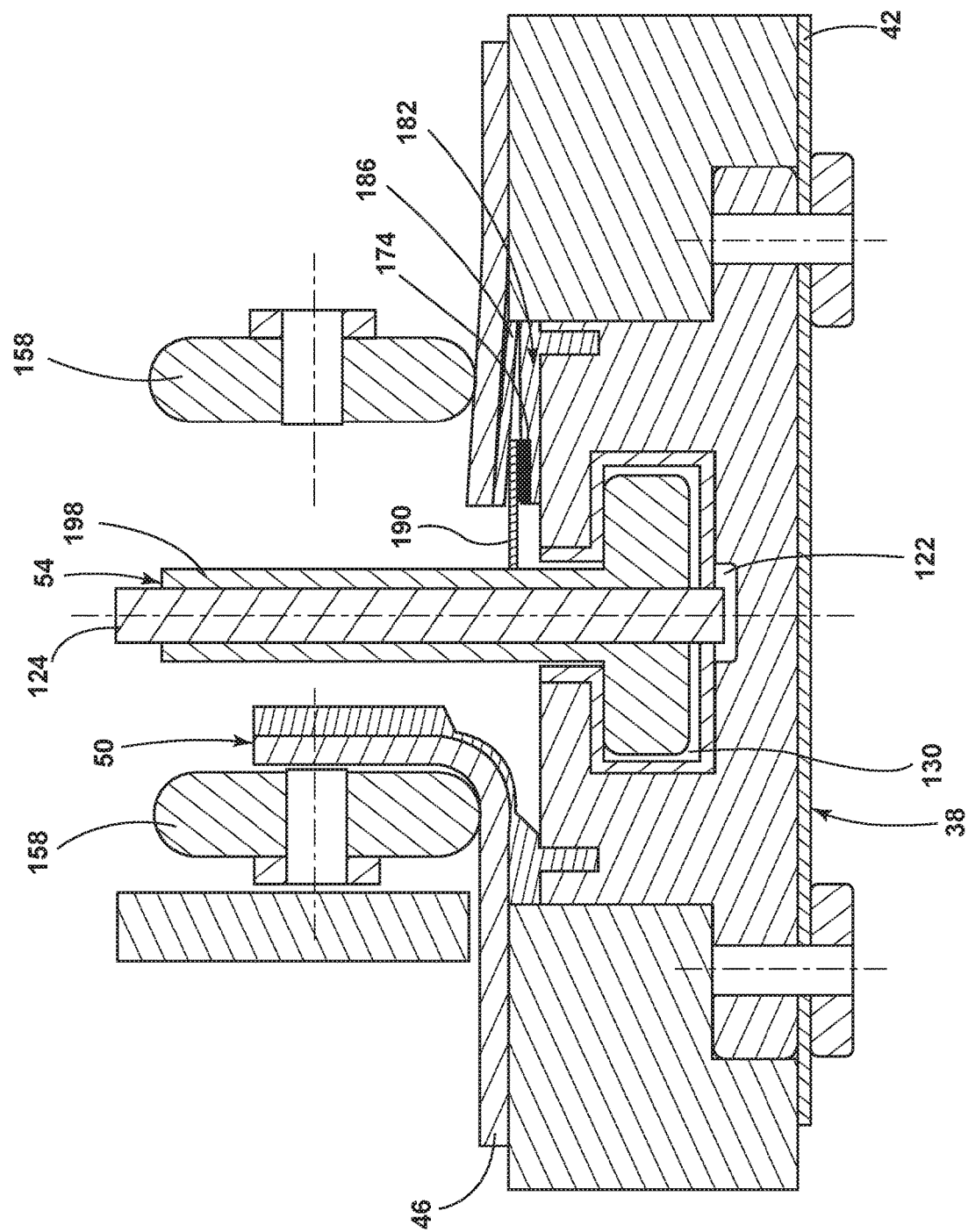
FIG. 12 is a cross-sectional view of the rail system and the anchor, taken along line IX-IX of FIG. 5, according to a another embodiment.

Referring now to FIGS. 11 and 12, the wheels 158 are operably coupled to the trim portion 150 such that one of the wheels 158 is generally positioned over the conductor 174 thereby providing a compressive force that may improve electrical contact between the electrical conductor 190 and the conductor 174. The depicted embodiment omits the first spring 214 and the second spring 218. The locking pin 124 is positioned within the post 198 and may be actuated between a raised position and a lowered position. The electrical conductor 190 extends from an exterior surface of the post 198. As the electrical conductor 190 passes through the conductor 174, the housing 182 of the conductor 174 is separated and opens about the living hinge 186 thereby establishing an electrical connection between the electrical conductor 190 and the conductor 174. In the depicted embodiment, the wheels 158 may support a majority of the weight of the seating assembly 58 while suspending the lower head 210 of the post 198 above the lower surface of the channel 130. Accordingly, the seating assembly 58 may be moved around the rail system 38 with less effort than if the lower head 210 rested upon the lower surface of the channel 130. The locking pin 124 may be placed in the lowered position when the anchor 54 is positioned above the locking pin aperture 122 and the locking pin 124 is aligned with the locking pin aperture 122. In some examples, the weight of the seating assembly 58 may be transferred into the wheel 158 and ultimately into the floor covering 46 to prevent the lower head 210 from contacting the steel rail 242. In such examples, the anchor 54 is prevented from binding in the rail system 38 as the surface of the lower head 210 and the steel rail 242 may not be provided with the low friction portion 216.

Figure 13:
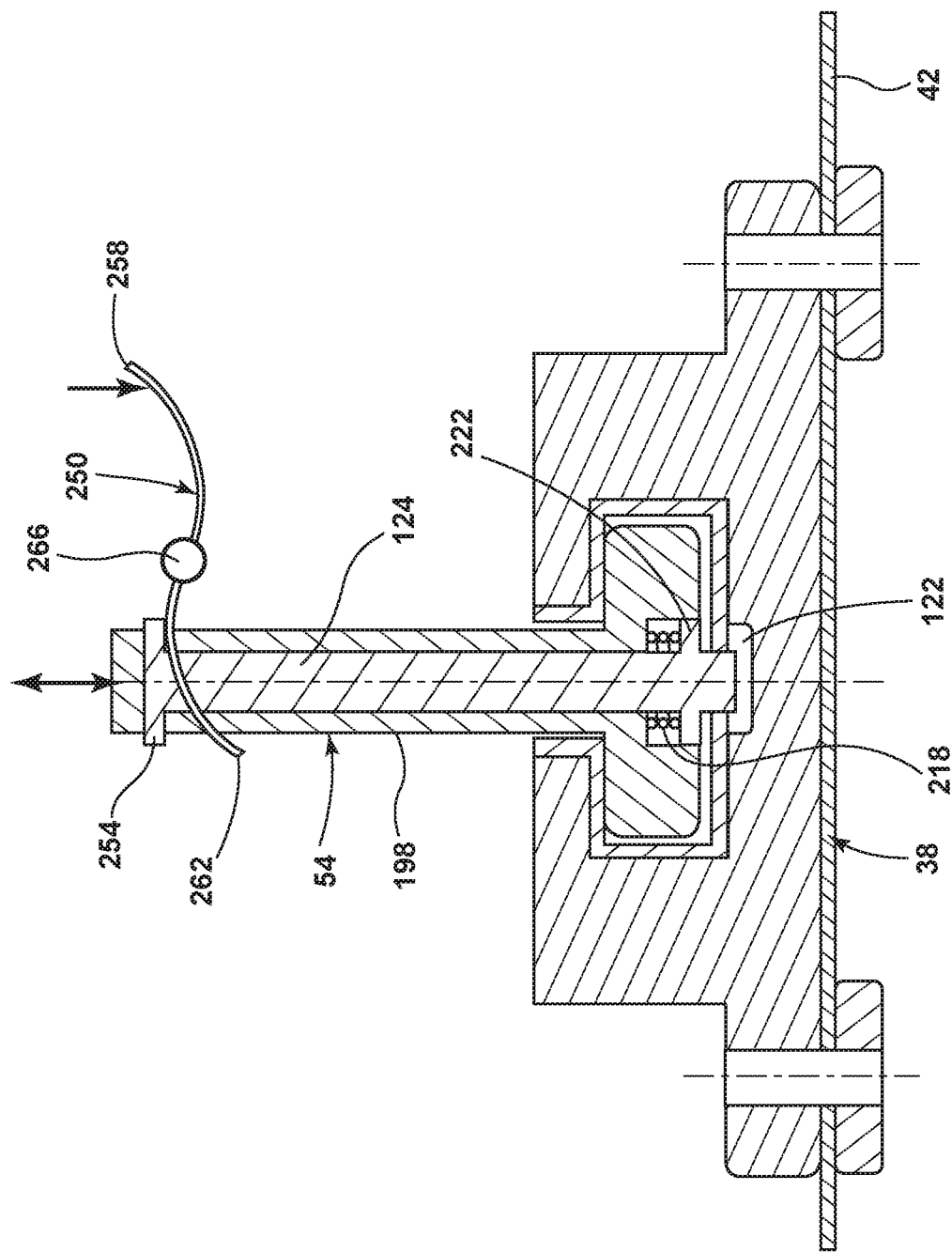
FIG. 13 is a cross-sectional view of the rail system and the anchor, taken along line IX-IX of FIG. 5, according to one embodiment.

Referring to FIG. 13, the rail system 38 is shown operably coupled to the floor pan 42 and having the anchor 54. According to various examples of the present disclosure, the locking pin 124 may be actuated within the post 286 of the anchor 54. For example, the locking pin 124 may be actuated in a vertical direction manually or by a powered mechanism. The depicted example illustrates one example of how the locking pin 124 may be actuated and may be applicable to manual and/or powered operation of the depicted mechanism. A lever 250 may engage with an underside of a platform 254 such that actuation of the lever 250 may raise the locking pin 124 out of the locking pin aperture 154. For example, the lever 250 may have a generally sinusoidal shape such that downward actuation of the lever 250 at a first end 258 induces upward motion of the lever 250 at a second end 262, which is translated into vertical motion of the locking pin 124. The lever 250 may have a pivot point 266 located between the first end 258 and the second end 262. For example, the pivot point 266 may be generally located at a center of a length of the lever 250.

Referring to FIG. 14, the rail system 38 is shown without the anchor 54 and depicts the bridge 50 of the floor covering 46 in a lowered or rest position. The rigid arm 162 of the bridge 50 spans the opening defined by the vertical leg of the channel 130 and contacts both the first side 166 and second side 178 of the rail system 38. By so covering the channel 130, the bridge 50 and floor covering 46 prevent debris, obstacles, and other items from entering the channel 130 that are not intended to be located within the channel 130. Additionally, a user is presented with a substantially level and substantially continuous surface of the floor covering 46 thereby eliminating tripping hazards and presenting the user with an aesthetically pleasing cabin 34. Further, the positioning and composition of the rigid arm 162 are such that upon application of pressure to the floor covering 46 directly above the channel 130, the bridge 50 is supported by the rail system 38 and prevented from entering the channel 130. The bridge 50 is prevented from entering the channel 130 as a result of an opposing force to the applied pressure which is provided at contact points 270 between the rail system 38 and the bridge 50.

Vehicles 30 are often provided with seating assemblies that can be adjusted for occupant comfort. Some seating assemblies in vehicles 30 are capable of translation in fore-aft or side-to-side directions. However, conventional seating assemblies are typically not capable of translation to various locations within the cabin 34 of the vehicle 30. Components of the cabin 34 of the vehicle 30 disclosed herein, such as the rail system 38, the seating assemblies 58, and the anchor 54 provide a user with a reconfigurable cabin 34. The seating assemblies 58 and other components coupled to the rail system 38 may be repositioned, reorganized, or reordered to assume various configurations that are suitable for the user's desired purpose. For example, the outboard seating assemblies in the second row of seats 94 engage with the rail system 38 and are configured in a manner that enables the outboard seating assemblies to be actuated rearward between the rearward wheel wells while maintaining functionality of the center seating assembly.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   first and second rows of seats;
   a rail system having a longitudinal track;
   a floor covering having a bridge that spans an opening defined by the rail system, wherein the bridge contacts first and second sides of the rail system when the bridge is in a lowered position such that the bridge covers the opening defined by the rail system; and
   first, second, and third seating assemblies each coupled to the rail system, wherein the first and third seating assemblies are actuatable along the rail system to be positioned between a pair of rearward wheel wells.

2. The vehicle of claim 1, wherein the first and third seating assemblies are positioned to be entirely between the pair of rearward wheel wells.

3. The vehicle of claim 2, wherein the actuation of the first and the third seating assemblies results in a translation of the first and the third seating assemblies in a rearward direction of at least about 25 cm.

4. The vehicle of claim 1, wherein the rail system is positioned in a floor pan of the vehicle.

5. The vehicle of claim 1, wherein actuation of the first and the third seating assemblies to between the rearward wheel wells maintains functionality of the second seating assembly.

6. The vehicle of claim 5, wherein the second seating assembly is actuated toward the first row of seats, and wherein the second seating assembly is utilized as a center console for the first row of seats.

7. The vehicle of claim 5, wherein the second seating assembly is utilized as a seating position by an occupant.

8. The vehicle of claim 5, wherein the second seating assembly is utilized by occupants of the first and the third seating assemblies as at least one of an ottoman, a work surface, an entertainment interface, and a storage area.

9. The vehicle of claim 1, wherein the first, second, and third seating assemblies are each coupled to the rail system by one or more anchors.

10. The vehicle of claim 9, wherein the one or more anchors each comprise:
    a post that is surrounded by a main body, wherein the post extends above and below the main body and terminates in an upper head and a lower head.

11. The vehicle of claim 10, wherein the one or more anchors each further comprise:
    a locking pin that is surrounded by the post, wherein the locking pin can be vertically actuated within the post.

12. The vehicle of claim 1, further comprising:
    a conductor positioned between the rail system and the floor covering, wherein the conductor comprises a housing that is equipped with a living hinge such that the housing permits access to the conductor by at least a portion of the anchor.

13. A vehicle, comprising:
    first and second rows of seats;
    a rail system having a longitudinal track; and first, second, and third seating assemblies each coupled to the rail system by one or more anchors, wherein the one or more anchors each comprise a post that is surrounded by a main body, the post extending above and below the main body and terminating in an upper head and a lower head, and wherein the first and third seating assemblies are actuatable along the rail system to be positioned between a pair of rearward wheel wells.

14. The vehicle of claim 13, wherein the first and third seating assemblies are positioned to be entirely between the pair of rearward wheel wells.

15. The vehicle of claim 13, wherein the one or more anchors each further comprise:
   a locking pin that is surrounded by the post, wherein the locking pin can be vertically actuated within the post.

16. The vehicle of claim 15, wherein actuation of the first and the third seating assemblies to between the pair of rearward wheel wells maintains functionality of the second seating assembly.

17. A vehicle, comprising:
   first and second rows of seats;
   a rail system having a longitudinal track;
   first, second, and third seating assemblies each coupled to the rail system by one or more anchors, wherein the first and third seating assemblies are actuatable along the rail system to be positioned between a pair of rearward wheel wells; and
   a conductor positioned between the rail system and a floor covering, wherein the conductor comprises a housing that is equipped with a living hinge such that the housing permits access to the conductor by at least a portion of the anchor.

18. The vehicle of claim 17, wherein actuation of the first and the third seating assemblies to between the pair of rearward wheel wells maintains functionality of the second seating assembly, and wherein the second seating assembly is utilized as at least one of an ottoman, a work surface, an entertainment interface, a center console, and a storage area.

19. The vehicle of claim 17, wherein the one or more anchors each comprise:
   a post that is surrounded by a main body, wherein the post extends above and below the main body and terminates in an upper head and a lower head.

20. The vehicle of claim 19, wherein the one or more anchors each further comprise:
   a locking pin that is surrounded by the post, wherein the locking pin can be vertically actuated within the post.

* * * * *